United States Patent [19]

Minner et al.

[11] 4,326,106
[45] Apr. 20, 1982

[54] TELEPHONE AMPLIFIER CIRCUIT

[75] Inventors: Willy Minner, Schwaigern; Rainer Rodenheber, Leingarten; Erhard Reitz, Oberursel, all of Fed. Rep. of Germany

[73] Assignees: Licentia Patent-Verwaltungs GmbH; Telefonbau und Normalzeit GmbH, both of Frankfurt am Main, Fed. Rep. of Germany

[21] Appl. No.: 117,273

[22] Filed: Jan. 31, 1980

[30] Foreign Application Priority Data

Feb. 3, 1979 [DE] Fed. Rep. of Germany ....... 2904096

[51] Int. Cl.³ .............................................. H04M 1/60
[52] U.S. Cl. .................................................. 179/81 B
[58] Field of Search .................. 179/81 R, 81 B, 81 A, 179/1 HF, 1 A, 77, 16 F; 330/291

[56] References Cited

U.S. PATENT DOCUMENTS 3,899,742  8/1975  Yum et al. .......................... 179/1 A

FOREIGN PATENT DOCUMENTS 2223002 11/1973 Fed. Rep. of Germany .... 179/81 R
1525964  9/1978 United Kingdom ............. 179/81 R

*Primary Examiner*—John H. Wolff
*Assistant Examiner*—J. A. Popek
*Attorney, Agent, or Firm*—Jacobson and Johnson

[57] ABSTRACT

A microphone amplifier in a telephone station furnished with current from the telephone network. When a capacitive degenerative feedback is used in the amplifier a certain time has to pass after applying the supply voltage before the operating point of the amplifier is reached because of the charging time of the capacitor. The switching of the supply voltage occurs at the dialing operation at each digit of a dial number since during the transmission period of a digit the handset including the microphone is switched off the subscriber line which carries the current usd for supplying the amplifier with energy. By the use of a special circuit the charging time of the capacitor is shortened drastically.

3 Claims, 1 Drawing Figure

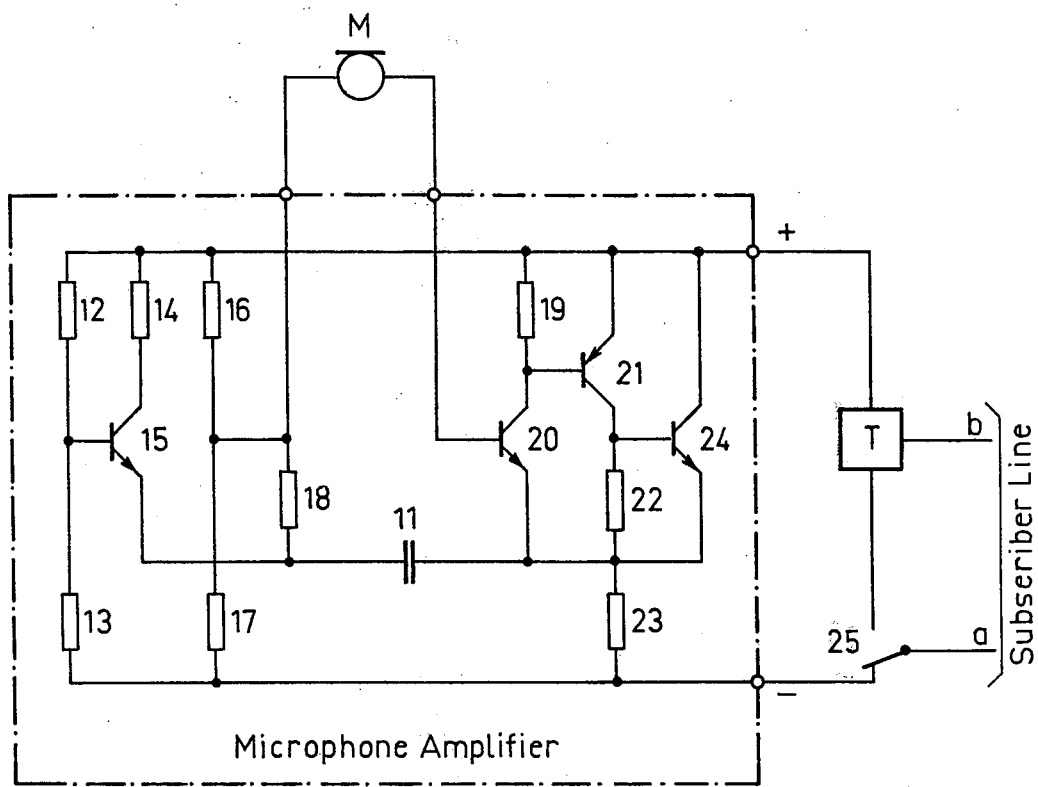

TELEPHONE AMPLIFIER CIRCUIT

BACKGROUND OF THE INVENTION

1. Field of the Invention

This invention relates to a microphone amplifier in a telephone station being furnished with current from the telephone network.

2. Description of the Prior Art

Microphone amplifiers are used in telephone stations for example in connection with electrodynamic microphones, since the level of the signals generated by the microphone is insufficient for transmission via the subscriber line to the exchange. Amplifiers of this kind are usually operated with the feeding current on the subscriber line furnished by the exchange.

When such an amplifier is provided with capacitive degenerative feedback a certain time has to pass before the operating point is reached after the amplifier is put into operation i.e. after the supply current is applied. An amplifier as described above is disclosed in the German Patent Application (Offenlegungsschrift) Ser. No. OS 28 12 735 which is similar to the amplifier circuit described in U.S. Pat. No. 3,899,742 dated Aug. 12, 1975.

During the charging period of the capacitor the amplifier acts like a resistor of high value, since the amplifier draws a very small current. This behavior causes a false operation during the dial process (pulse or multifrequency dialing), since after the transmission of a digit from the dial transmitter the subscriber line is switched to the speaking circuit (microphone) for taking over the line current immediately. As long as the amplifier has a high impedance the line current can only be led via the line balancing network. Because of the higher impedance of the latter the line current cannot reach its normal value. This may cause under certain operational circumstances a condition which may be recognized in the telephone exchange as open line.

SUMMARY OF THE INVENTION

It is therefore the object of the invention to improve a telephone amplifier circuit to attain its low operational impedance in the moment the supply current is applied.

According to the invention the amplifier circuit contains a circuit arrangement which speeds up the charging time of the capacitor by bypassing the high value resistors by a series connection of a transistor and a resistor. The transistor conducts during the time the amplifier is reaching its operating point and when the amplifier reaches its operational point the bypass-circuit has no influence on the normal function of the amplifier.

DETAILED DESCRIPTION OF THE DRAWING

The drawing shows a microphone amplifier of a telephone station T which is connected via the subscriber line consisting of the wires a and b to the telephone exchange not shown. Switch 25 which may be a mechanical contact or an electronic switch is shown in the normal operating position whereby the microphone amplifier is connected to the subscriber line for the transmission of the audio frequency signals and for receiving line current furnished by the telephone exchange.

At the dialing operation switch 25 is operated during the transmission period of each digit of the dial information in order to switch the microphone amplifier circuit off the subscriber line. This is necessary for raising ths subscriber line current and for preventing the dialing signals from reaching the receiver in the handset or the loudspeaker.

The specific microphone amplifier circuit for microphone M consists of the voltage divider formed by the series connection of resistors 16 and 17 for the setting of the operational point of transistor 20. The voltage divider is connected to the supply voltage and its tap connection leads to one side of the microphone M whose other terminal is connected to the base of transistor 20. The collector of transistor 20 is connected via resistor 19 to the positive supply voltage and directly to the base of transistor 21 whose emitter is connected directly to the positive supply voltage. The collector of transistor 21 is connected to the base of the amplifier output transistor 24 whose collector is connected directly to the positive supply voltage. The capacitive degenerative feedback circuit is formed by resistor 18 and capacitor 11.

One end of resistor 18 is connected to the tap of the voltage divider 16/17. Capacitor 11 is connected to one end of resistor 23, to the emitters of transistor 20 and transistor 24 and to the junction of resistor 22 and 23. The other terminal of resistor 22 is connected to the collector of transistor 21 and the base of transistor 24. The other terminal of resistor 23 is connected to the negative supply voltage.

When the supply voltage is applied to the amplifier circuit (by operation of switch 25) normally capacitor 11 would be charged by a current from the positive supply voltage through resistor 16 via resistors 18 and 23 to the negative supply voltage. After capacitor 11 is charged the amplifier is in the operational condition.

The audio frequency signals generated by the microphone M control transistor 20 via its base. These signals are amplified by the transistors 20, 21 and 24, the latter forming the amplifier output stage actually modulating the line current on the wires a and b of the subscriber line.

The added circuit to speed up the charge comprises the series connection of resistors 12 and 13 connected across the supply voltage with the tap between resistors 12 and 13 connected to the base of transistor 15, whose collector is connected to the positive supply voltage via resistor 14 and whose emitter is connected to the tap between resistor 18 and capacitor 11.

The speed-up circuit has two operational conditions, the beginning of the charging operation at the moment the supply voltage is applied and the idle condition after the charging operation is performed and the amplifier is in the normal operating condition.

At the beginning of the charging operation the differential resistance of the charging circuit can be determined by the equation $$R_{D\,on} = (1 + R_{12}/R_{13}) \cdot R_{23}$$

After the performance of the charging operation the differential resistance of the charging circuit can be determined by the equation $$R_D = (1 + R_{16}/R_{17}) \cdot R_{23}$$

The connection of the speed-up circuit to the capacitor 11 reduces the charging time considerably. The collector resistor 14 does not influence the charging time but limits the charging current to a value which does not destroy the circuit in case of a lighting stroke on the subscriber line.

The described telephone amplifier circuit is well suited for the insertion into the microphone housing as an integrated circuit.

What is claimed is:

1. In a microphone amplifier with a capactive degenerative feedback circuit in a telephone station furnished with current from the telephone network via a two-wire subscriber line, a speed-up circuit for initially charging a capacitor in the feedback circuit when supply voltage across the subscriber line is applied to the station, comprising:

a three-electrode transistor (15) having one electrode connected to one terminal of the feedback capacitor (11) the other capacitor terminal being coupled to one of the subscriber line wires;

resistance means connected between the two subscriber line wires and connected to the control electrode of said transistor (15); and the third electrode of the transistor (15) coupled to the other subscriber line wire.

2. The circuit as described in claim 1 wherein the resistance means comprises a voltage divider (12, 13), each of the outer terminals of the voltage divider being connected to a different subscriber line wire and the voltage divider tap connected to the control electrode of the transistor (15) for biasing said transistor to conduct when the supply voltage is applied.

3. The circuit as described in claim 2 wherein the third electrode of said transistor (15) is connected to the other subscriber line wire via a current-limiting resistor (14).

* * * * *